Figure 3:
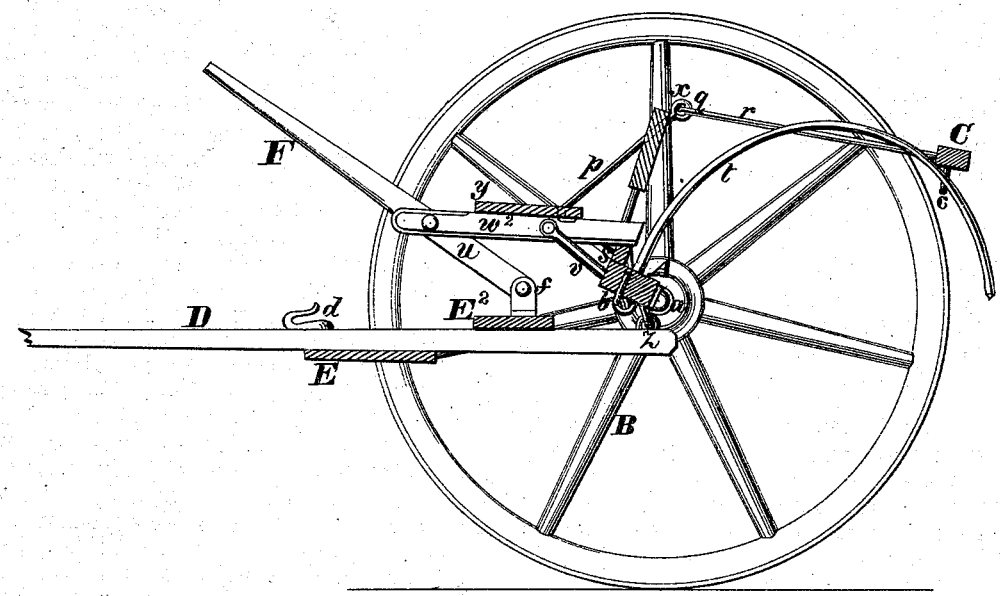

2 Sheets--Sheet 1.
C. F. WALKER.
Horse Hay-Rakes.
No. 154,933. Patented Sept. 8, 1874.
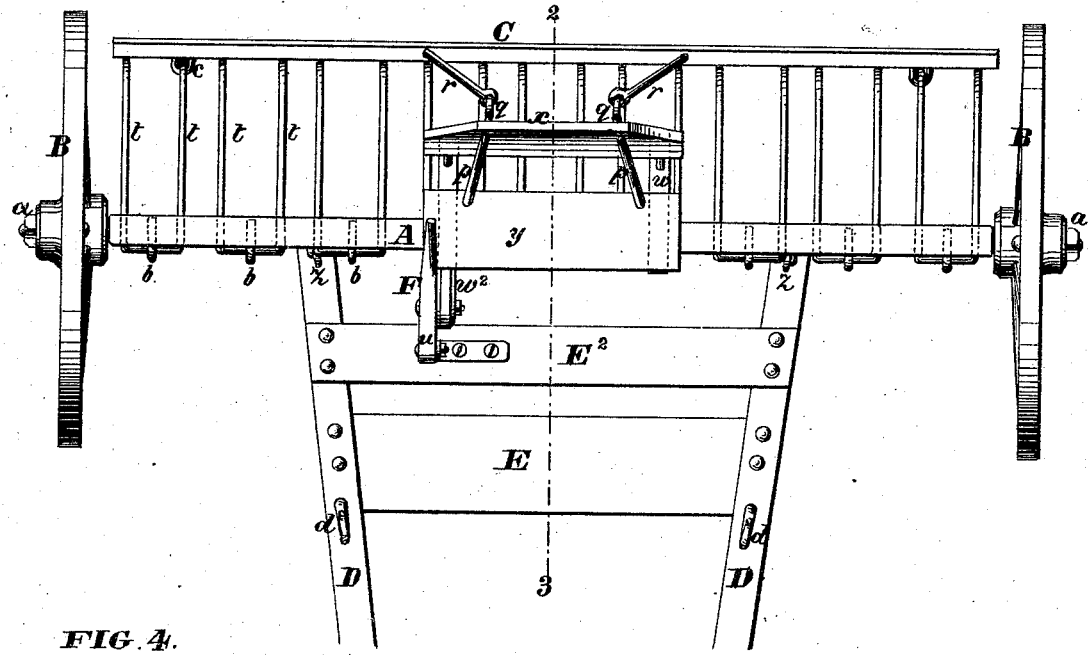
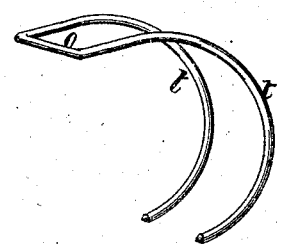
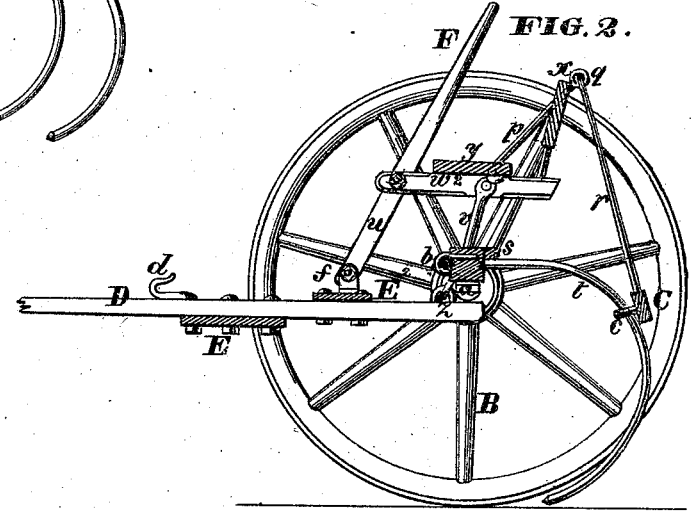
WITNESSES
Jas L. Ewin
Walter Allen
INVENTOR
Charles F. Walker
By Knight Bro. Attorneys 2 Sheets--Sheet 2.

C. F. WALKER.
Horse Hay-Rakes.

No. 154,933. Patented Sept. 8, 1874.

WITNESSES
Jas. L. Ewin
Walter Allen

INVENTOR
Charles F. Walker
By Knight Bro, Attorneys

UNITED STATES PATENT OFFICE.

CHARLES F. WALKER, OF FRIEDENS, PENNSYLVANIA.

IMPROVEMENT IN HORSE HAY-RAKES.

Specification forming part of Letters Patent No. 154,933, dated September 8, 1874; application filed March 3, 1874.

*To all whom it may concern:*

Be it known that I, CHARLES F. WALKER, of Friedens, in the county of Somerset and State of Pennsylvania, have invented an Improved Horse Hay-Rake, of which the following is a specification:

This invention relates primarily as an improvement to my rake patented 29th July, 1862. The improved implement is a wheeled rake of that form in which the axle-tree constitutes an oscillating rake-head, and the thills are hinged thereto. The rake-teeth, which are of peculiar construction, are elevated by a forward movement of the operator's body acting through a rocking seat on the axle, and by his weight acting through the seat-supports and thills, and a clearer is simultaneously actuated to strip the teeth of any hay which may cling thereto.

The present invention consists in the said improved clearer attachment connected to a tilting seat, and in teeth made in pairs, in combination with certain means for fastening these teeth, as hereinafter set forth. By these means a light, strong, cheap, and easily-operated rake is produced.

Figure 1 is a plan view of this improved horse hay-rake. Fig. 2 is a vertical longitudinal section of the same on the line 2 3, Fig. 1, showing the parts in working position. Fig. 3 is a similar view on a larger scale, showing the position of the parts with the teeth in elevated position. Fig. 4 is a perspective view of a pair of teeth detached.

The carriage of this rake is composed of a wooden axle-tree, A, having metallic spindles $a$ bolted to its ends; a pair of light supporting-wheels, B, thereon, of any approved construction; a pair of extended thills, D, provided with draft-hooks $d$, and attached, by hinges $z$, to the lower front edge of the axle-tree; and a pair of transverse boards, E E$^2$, bolted to the thills, to constitute a platform. A driver's seat is formed by attaching a seat-board, $y$, and a back-board, $x$, to end bars or bearers $w$ $w^2$, and this seat is pivoted to the upper ends of a pair of standards, $v$, applied to the axle-tree. The horizontal, or nearly horizontal, position of the seat is preserved by a link, $u$, which is a part of a hand-lever, F, and is attached to the platform-board E$^2$ by a hinge-bracket, $f$, and pivoted to an extension of one of the seat-bearers $w^2$. The seat is sustained in position over the axle-tree while the teeth are gathering, as shown in Figs. 1 and 2, by this link $u$ in front operating in conjunction with the teeth $t$ behind.

When the driver desires to elevate the rake-teeth he moves the lever F forward, or rocks forward the seat with his body sufficiently to bring the upper ends of the standards $v$ and link $u$ in front of the axle-spindles and of the hinge-bracket, respectively. His weight then, acting through the standards $v$, and through the link $u$, platform E E$^2$, thills D, and hinges $z$, operates to turn the axle-tree on the spindles B, and to elevate the teeth, as illustrated in Fig. 3. To sustain the driver's seat while the teeth are in elevated position a bar, $s$, is applied longitudinally to the back of the axle-tree, and the rear ends of the seat-bearers $w$ $w^2$ rest thereon, as illustrated in Fig. 3.

To restore the teeth to working position, Fig. 2, the driver rocks back in his seat, and simultaneously pulls the lever F, or he can adjust the parts by rocking back without pulling the lever. He can assist the holding down of the teeth to fill them by pressing back in his seat, and the rake, when full, often empties itself by the driver letting the seat come forward.

In order to clean the teeth simultaneously with their elevation, in a superior manner, a clearer, C, consisting of a single light bar parallel to the axle-tree, and guided by two or more staples, $c$, embracing different teeth, is connected, by a pair of rods, $r$, to eyes $q$ at the upper edge of the seat-back. When the seat is thrown forward to elevate the teeth, this clearer is pushed backward from the position shown in Fig. 2 to that shown in Fig. 3, and thus operates with superior efficiency to remove any hay which may have clung to the teeth. This device is also simple and strong, and adds but a trifle to the cost of the rake.

The eyes $q$ are formed at the upper ends of rods $p$, which are clinched beneath the seat-board $y$, and thus operate to brace the back. To facilitate making and attaching the teeth $t$, they are formed in pairs, as shown in Fig. 3, each pair being united by a rigid link, $o$, at the upper end, and formed in one part from a single wire or rod, and each pair of teeth is fastened by a single central staple, $b$, applied to this link, and passing through or into the axle-tree parallel to the shanks of the teeth. To receive the teeth, the axle-tree is simply provided with horizontal perforations, at right angles to its axis and in a single central plane. The perforations being small and distributed, they will not materially weaken an axle-tree of ordinary size. The teeth may work in slots or not, as preferred.

Having described this my invention, I claim—

1. A wheeled horse hay-rake having a rocking or tilting seat and a clearer connected to the top of the seat-back, in combination with curved rake-teeth and an oscillating axle-tree, to which the seat and teeth are attached, substantially as herein described, said clearer receiving a positive backward thrust from the tilting seat simultaneously with the elevation of the teeth thereby, as set forth.

2. The combination of the teeth $t\ t$, formed in pairs, the axle-tree A, having parallel horizontal perforations in a single central plane to receive and support the teeth, and the fastening-staples $b$, one to each pair of teeth, substantially as shown and described, for the purpose specified.

CHARLES F. WALKER.

Witnesses:
SAMUEL SNYDER,
HARRISON BENDER.